United States Patent
Matsumoto

(10) Patent No.: US 9,598,031 B2
(45) Date of Patent: Mar. 21, 2017

(54) VEHICLE

(71) Applicant: TOYOTA JIDOSHA KABUSHIKI KAISHA, Toyota-shi, Aichi-ken (JP)

(72) Inventor: Junichi Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/052,236

(22) Filed: Feb. 24, 2016

(65) Prior Publication Data

US 2016/0254661 A1    Sep. 1, 2016

(30) Foreign Application Priority Data

Feb. 26, 2015   (JP) ................ 2015-036672

(51) Int. Cl.
| | |
|---|---|
| H02H 5/04 | (2006.01) |
| B60R 16/033 | (2006.01) |
| H02H 3/04 | (2006.01) |
| H02H 9/00 | (2006.01) |
| H02H 3/05 | (2006.01) |
| H02H 7/18 | (2006.01) |

(52) U.S. Cl.
CPC ......... B60R 16/033 (2013.01); H02H 3/044 (2013.01); H02H 9/008 (2013.01); *H02H 3/05* (2013.01); *H02H 7/18* (2013.01)

(58) Field of Classification Search
CPC ........ H01H 37/08; H01H 37/32; H01H 69/02; H01H 85/04; H02H 7/18; H02H 3/08; B60R 16/033

USPC ...... 361/31, 32, 37, 102, 103, 104; 318/139, 318/471

See application file for complete search history.

(56) References Cited

U.S. PATENT DOCUMENTS

| | | | | |
|---|---|---|---|---|
| 4,951,168 | A * | 8/1990 | Harrison ................. | H02H 7/04 336/144 |
| 6,859,039 | B2 * | 2/2005 | Horie ................. | G01N 33/2888 324/438 |
| 6,984,946 | B2 * | 1/2006 | Donnelly ................ | B60L 3/102 105/61 |
| 2002/0039270 | A1 * | 4/2002 | Sato ....................... | H02H 9/042 361/93.1 |

(Continued)

FOREIGN PATENT DOCUMENTS

JP    2011-078184 A    4/2011

*Primary Examiner* — Bentsu Ro
*Assistant Examiner* — Thai Dinh
(74) *Attorney, Agent, or Firm* — Oliff PLC

(57) ABSTRACT

A vehicle capable of running by using dynamic power of a motor includes: a battery to perform input/output of electric power for the motor; a fuse to be connected in series with the battery and to melt when an electric current exceeding a permissible value flows; and a control apparatus to restrict magnitude of the input/output electric power of the battery to less than an upper limit electric power. The control apparatus calculates a degradation level of the fuse such that degradation proceeds whenever temperature of the fuse exceeds a threshold temperature, and reduces the upper limit electric power when the degradation level of the fuse exceeds a target degradation level. The target degradation level is a value that is lower than a limit degradation level corresponding to a degradation level when the degradation of the fuse reaches a limit and that becomes higher as mileage of the vehicle increases.

5 Claims, 13 Drawing Sheets

(56) References Cited

U.S. PATENT DOCUMENTS

2014/0012520 A1* 1/2014 Zhao ..................... H02H 3/042
                                                                  702/58

\* cited by examiner

⟨CASE OF ADVANCE DIFFERENCE D(+)⟩

VEHICLE

INCORPORATION BY REFERENCE

The disclosure of Japanese Patent Application No. 2015-036672 filed on Feb. 26, 2015 including the specification, drawings and abstract is incorporated herein by reference in its entirety.

BACKGROUND OF THE INVENTION

1. Field of the Invention

The invention relates to a vehicle including a fuse connected in series with a battery that performs the input/output of electric power for a motor.

2. Description of Related Art

As a vehicle capable of running by using the dynamic power of a motor, there is a vehicle including a fuse that is connected in series with a battery and that melts by overcurrent, for protecting a high-voltage system circuit that connects the motor and the battery.

As the vehicle including the fuse that is connected in series with the battery, Japanese Patent Application Publication No. 2011-78184 discloses a technology that determines the degradation level of the fuse from a temperature history of the fuse and that gives a warning for the exchange of the fuse when the degradation level of the fuse exceeds a predetermined value. According to the technology, it is possible to prompt a user to exchange the fuse, before the break of the fuse occurs due to the degradation.

However, in the technology disclosed in JP 2011-78184 A, in the case where the battery is used hard, as exemplified by the case where the user frequently repeats a sudden acceleration and a sudden deceleration, there is a concern that the degradation level of the fuse becomes high early and the life of the fuse becomes shorter than expected.

SUMMARY OF THE INVENTION (US)

The invention provides a vehicle that inhibits the break of the fuse due to the degradation and that extends the life of the fuse.

A vehicle according to a first aspect of the invention is a vehicle capable of running by using dynamic power of a motor, the vehicle including: a battery configured to perform input/output of electric power for the motor; a fuse configured to be connected in series with the battery and to melt when an electric current exceeding a permissible value flows; and a control apparatus configured to restrict magnitude of the input/output electric power of the battery to less than an upper limit electric power. The fuse, in which the degradation proceeds whenever the temperature of the fuse exceeds a threshold temperature, melts also in the case where an electric current less than the permissible value flows when the degradation of the fuse reaches a limit. The control apparatus is configured to calculate a degradation level of the fuse such that the degradation proceeds whenever the temperature of the fuse exceeds the threshold temperature, and is configured to reduce the upper limit electric power when the degradation level of the fuse exceeds a target degradation level. The target degradation level is a value that is lower than a limit degradation level corresponding to a degradation level when the degradation of the fuse reaches the limit and that becomes higher as the mileage of the vehicle increases.

According to such a configuration, when the degradation level of the fuse exceeds the target degradation level, which is lower than the limit degradation level, the upper limit electric power is reduced, and a further degradation of the fuse is inhibited. Therefore, the degradation level of the fuse is inhibited from reaching the limit degradation level, that is, the fuse is inhibited from melting due to the degradation even though an electric current less than the permissible value flows. Furthermore, the target degradation level is set to a higher value as the mileage of the vehicle increases. Therefore, when the mileage is low, the target degradation level is set to a sufficiently low value relative to the limit degradation level, and it is possible to inhibit the degradation of the fuse more strongly. Thereby, it is possible to inhibit the degradation level of the fuse from reaching the limit degradation level early, in a state in which the mileage is low, and to extend the life of the fuse.

Preferably, the temperature of the fuse should be lower than the threshold temperature when the magnitude of the input/output electric power of the battery is a predetermined electric power or less. The control apparatus may be configured to set the upper limit electric power to a first electric power greater than the predetermined electric power, when the degradation level of the fuse is lower than the target degradation level, and may be configured to reduce the upper limit electric power to a second electric power equal to or less than the predetermined electric power, when the degradation level of the fuse exceeds the target degradation level.

According to such a configuration, the upper limit electric power is reduced to the second electric power, when the degradation level of the fuse exceeds the target degradation level. Thereby, the temperature of the fuse becomes lower than the threshold temperature, and it is possible to inhibit a further degradation of the fuse.

Preferably, the control apparatus may be configured to reduce the upper limit electric power from the first electric power to the second electric power in stages, depending on a difference by which the degradation level of the fuse exceeds the target degradation level.

According to such a configuration, the upper limit electric power is reduced from the first electric power to the second electric power in stages, and therefore, it is possible to inhibit the output of the battery (the output of the motor) from changing suddenly.

Preferably, the control apparatus may be configured to execute a slope inhibition control when electric power supply from an auxiliary-machine battery to the control apparatus is restarted after the electric power supply is interrupted, the slope inhibition control being a control to reduce the upper limit electric power when an increase amount of the degradation level of the fuse per unit mileage exceeds an increase amount of the target degradation level per unit mileage.

According to such a configuration, even when the control apparatus is mounted in a different vehicle after the electric power supply from the auxiliary-machine battery to the control apparatus is interrupted, the degradation level of the fuse becomes lower than the target degradation level, and it is possible to inhibit adequately an on-road failure of the fuse.

Preferably, the control apparatus may be configured to store a difference right before the electric power supply is interrupted, and to hold the difference even after the electric power supply is interrupted, the difference being a difference resulting from subtracting the target degradation level from the degradation level of the fuse. The control apparatus may be configured to start the slope inhibition control from a state in which the mileage is reset to zero and the degradation level of the fuse is reset to a value depending on the difference, when the electric power supply is restarted.

According to such a configuration, it is possible to start the slope inhibition control from a starting point that depends on the difference between the degradation level of the fuse and the target degradation level right before the electric power supply is interrupted. Therefore, it is possible to inhibit more adequately an on-road failure of the fuse after the electric power supply is restarted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
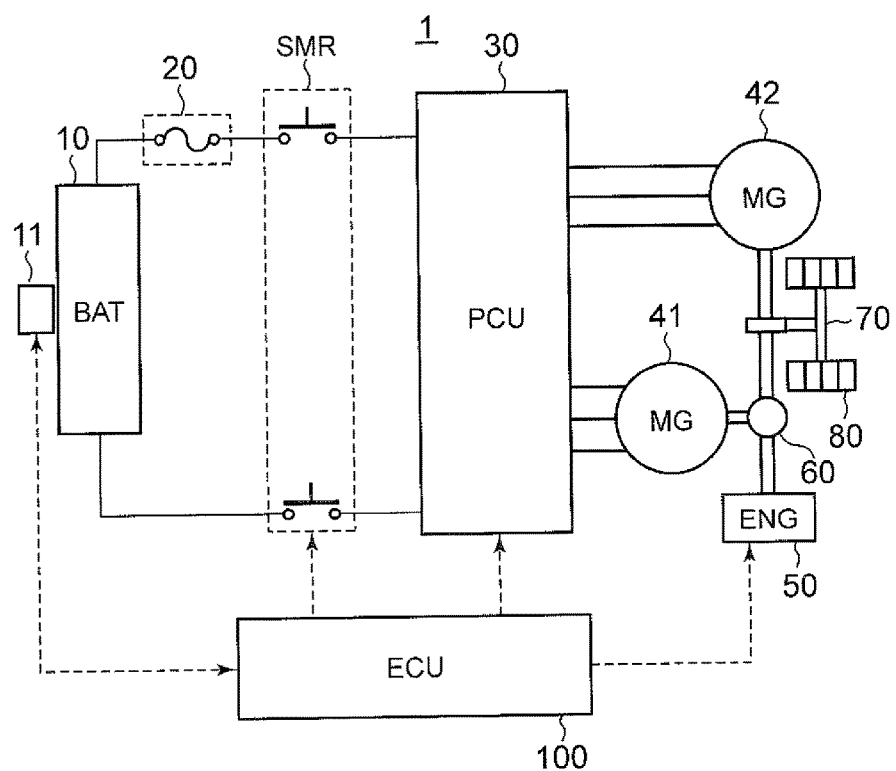
FIG. 1 is an overall configuration diagram of a vehicle.

Hereinafter, embodiments of the invention will be described in detail, with reference to the drawings. Here, in the drawings, for identical or equivalent parts, identical reference characters are assigned, and descriptions therefor are not repeated.

Embodiment 1

Overall Configuration of Vehicle

FIG. 1 is an overall configuration diagram of a vehicle 1 according to an embodiment. Here, the vehicle 1 shown in FIG. 1 is a hybrid vehicle to run by using the dynamic power of at least one of an engine 50 and a motor generator 42 that is driven by the electric power of a battery 10. Vehicles to which the embodiment can be applied are not limited to hybrid vehicles, and the embodiment can be applied to all vehicles equipped with a secondary battery that accumulates the electric power for generating vehicle driving force.

The vehicle 1 includes the battery 10, a monitoring unit 11, a fuse 20, a system main relay SMR, a PCU (Power Control Unit) 30, motor generators (MGs) 41, 42, the engine 50, a dynamic power division mechanism 60, a drive shaft 70, wheels 80, and an ECU (Electronic Control Unit) 100.

The battery 10 is a secondary battery that accumulates the electric power for driving the MGs 41, 42. The battery 10 is configured such that multiple battery cells are connected in series.

The engine 50 outputs kinetic energy by the combustion energy of fuel. The output of the engine 50 is divided and transmitted to the MG 41 and the drive shaft 70, by the dynamic power division mechanism 60. The MG 41 is connected with the drive shaft 70. The drive shaft 70 is rotated by the output of the engine 50 and/or the MG 42.

The MGs 41, 42 can function as both electric generators and electric motors. The MG 41 operates mainly as an electric generator, and the MG 42 operates mainly as an electric motor.

At the time of an engine start request such as the time of acceleration, the MG 41 is driven as an electric motor by receiving the electric power supply from the battery 10 through the PCU 30, and performs the cranking of the engine 50. After the start of the engine 50, the MG 41 can generate electric power by using the engine output transmitted through the dynamic power division mechanism 60.

The MG 42 is driven by at least one of the electric power accumulated in the battery 10 and the electric power generated by the MG 41. At the time of the regenerative braking of the vehicle 1, the MG 42 is driven by the rotating force of the wheels 80, and thereby, generates electric power. The regenerative electric power generated by the MG 42 is stored in the battery 10 through the PCU 30.

The PCU 30 performs the bidirectional electric power conversion between the battery 10 and the MGs 41, 42. The PCU 30 includes an inverter that converts the direct-current electric power from the battery 10, into alternating-current electric power, and applies the alternating-current electric power to the MGs 41, 42. The inverter can convert the regenerative electric power from the MGs 41, 42, into direct-current electric power, and can store the direct-current electric power in the battery 10.

The system main relay SMR is provided between the battery 10 and the PCU 30. The system main relay SMR includes a cathode-side relay provided on a cathode line that connects a cathode of the battery 10 and the PCU 30, and an anode-side relay provided on an anode line that connects an anode of the battery 10 and the PCU 30. The system main relay SMR (the cathode-side relay and the anode-side relay) switches between a closed state (on-state) and an opened state (off-state), in response to a control signal from the ECU 100. When the system main relay SMR is in the off-state, the battery 10 is separated from the PCU 30 and the MGs 41, 42.

The monitoring unit 11 detects temperature Tb, voltage Vb and electric current Ib of the battery 10, and sends the detection results to the ECU 100.

The ECU 100 incorporates a CPU (Central Processing Unit) and memories (a volatile memory and a nonvolatile memory), which are not illustrated, and executes a predetermined computation process, based on detection results of sensors, the information stored in the memories, and the like.

The ECU 100 calculates the SOC (State Of Charge) of the battery 10, based on at least one of the electric current Ib and voltage Vb of the battery 10. Here, as the calculation method for the SOC, various known techniques such as a calculation method of using a relation between the voltage Vb and the SOC and a calculation method of using an integrated value of the electric current Ib can be used.

The ECU 100, while adopting a fuse degradation level Y as a parameter, sets an allowable input electric power WIN and an allowable output electric power WOUT (each unit of them is watt) of the battery 10. The ECU 100 controls the MGs 41, 42, such that the magnitude of the electric power to be input to the battery 10 does not exceed the allowable input electric power WIN and the magnitude of the electric power to be output from the battery 10 does not exceed the allowable output electric power WOUT.

The fuse 20 is disposed between the cathode of the battery 10 and the system main relay SMR (cathode-side relay), and is connected in series with the battery 10. Here, the position of the fuse 20 only needs to be a position where the fuse 20 is connected in series with the battery 10, and is not limited to the position shown in FIG. 1 (the position between the cathode of the battery 10 and the system main relay SMR).

When an electric current less than a permissible value flows, the fuse 20 functions as a conductor. When a great electric current exceeding the permissible value flows, the fuse 20 melts by Joule heat. The melting of the fuse 20 (hereinafter, referred to as "fuse blowout" also) opens an electric circuit in a high-voltage system including the battery 10, the PCU 30 and the MGs 41, 42, so that the electric circuit in the high-voltage system is protected.

Configuration and Characteristic of Fuse

Figure 2:
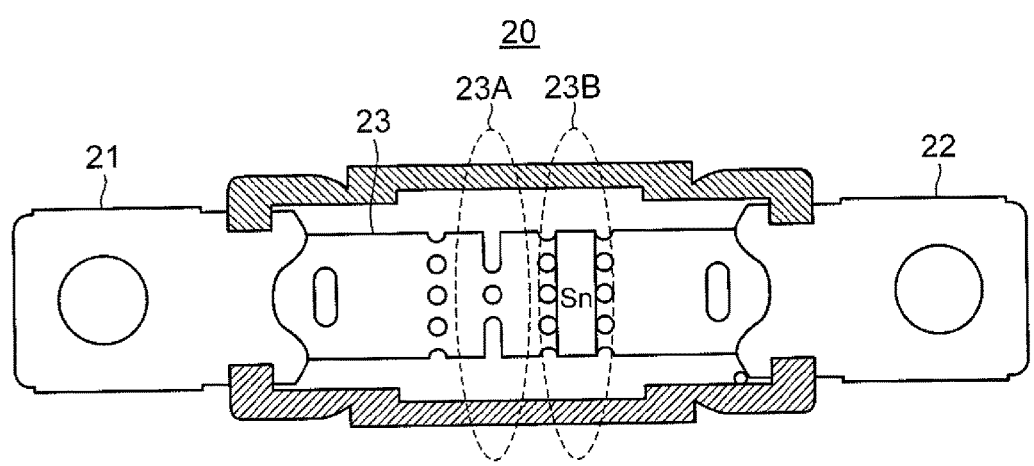
FIG. 2 is a diagram schematically showing a configuration of a fuse.

FIG. 2 is a diagram schematically showing a configuration of the fuse 20. The fuse 20 includes a terminal 21 connected with the battery 10, a terminal 22 connected with the system main relay SMR, and a pure copper (Cu) element 23 connecting the terminals 21, 22.

The element 23 includes a first melting part 23A whose cross-section area is smaller than that of the other part, and a second melting part 23B in which tin (Sn) is applied on the surface. At least one of the first melting part 23A and second melting part 23B of the element 23 melts, at the time of an abnormality in which a great electric current exceeding the permissible value flows.

Figure 3:
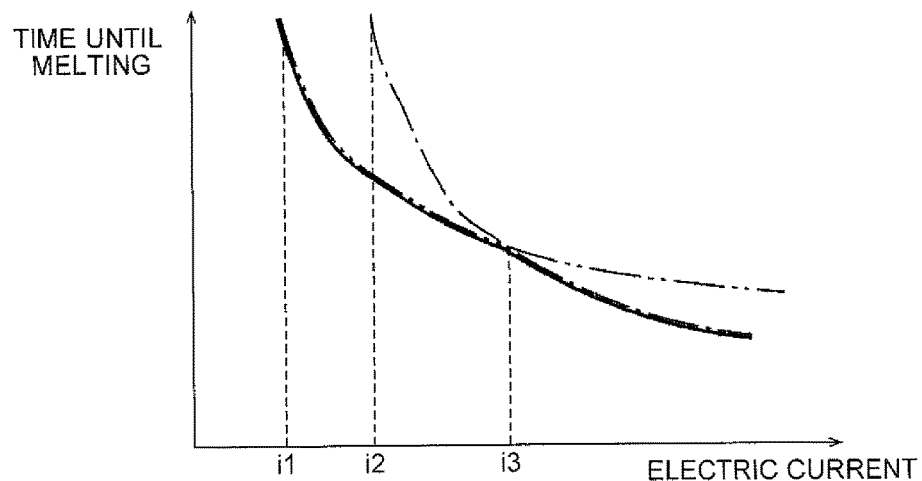
FIG. 3 is a diagram schematically showing a melting characteristic of the fuse.

FIG. 3 is a diagram schematically showing a melting characteristic of the fuse 20. In the embodiment, the melting characteristic is a correspondence relation between an electric current to flow through the fuse 20 and the time until the fuse 20 melts in the case where the electric current flows continuously. In FIG. 3, the melting characteristic of the first melting part 23A is shown by a chain line, the melting characteristic of the second melting part 23B is shown by a two-dot chain line, and the melting characteristic of the whole of the fuse 20 is shown by a solid line.

Since the cross-section area is smaller than that of the other part, the first melting part 23A, in the fuse 20, is highest in electric resistance value and is highest in Joule heat quantity to be generated. As shown by the chain line in FIG. 3, when a great electric current equal to or greater than an electric current i2 (for example, 150 A) flows, the first melting part 23A melts because of reaching nearly the melting point (about 1085° C.) of pure copper by Joule heat.

A certain amount of time is required until the first melting part 23A melts. The greater the electric current is, the shorter the time is.

On the other hand, the second melting part 23B melts when an electric current equal to or greater than an electric current i1 (for example, 125 A) that is less than the electric current i2 flows. Specifically, when an electric current of the electric current i1 or greater flows through the second melting part 23B so that the second melting part 23B is overheated to a threshold temperature T1 (for example, about 150° C.) or higher, the tin applied on the surface starts to irreversibly dissolve in the copper. The alloying (dissolution) of tin and copper in the second melting part 23B irreversibly proceeds whenever the second melting part 23B is overheated to the threshold temperature T1 or higher.

When a solid solution of tin and copper (an alloy in which tin and copper are uniformly mixed in a solid state) is formed in the whole cross-section of the second melting part 23B, the electric resistance value of the second melting part 23B rises considerably, and the amount of heat generation increases. Therewith, the melting point of the second melting part 23B is reduced from the melting point (about 1085° C.) of pure copper to the melting point (about 400 to 800° C.) of the solid solution of tin and copper. By this influence, as shown by the two-dot chain line in FIG. 3, the second melting part 23B melts earlier than the first melting part 23A, in a region of less than an electric current i3. That is, by providing the second melting part 23B, a smaller electric current makes it possible to melt the fuse 20 early, compared to the case of providing only the first melting part 23A.

Thus, in the fuse 20 according to the embodiment, in the region of less than the electric current i3, the second melting part 23B melts before the first melting part 23A, and in the region of greater than the electric current i3, the first melting part 23A melts before the second melting part 23B. Therefore, in the region of less than the electric current i3, the melting characteristic of the second melting part 23B is regulated (the applied area, applied amount and others of tin are regulated), and in the region of greater than the electric current i3, the melting characteristic of the first melting part 23A is regulated (the cross-section area of copper is regulated). Thereby, the melting characteristic of the whole of the fuse 20 can be regulated to a characteristic intended by a developer.

Outline of Fuse Degradation Inhibition Control

As described above, the dissolution of tin and copper in the second melting part 23B of the fuse 20 irreversibly proceeds whenever the second melting part 23B is overheated to the threshold temperature T1 or higher. When the dissolution of tin and copper proceeds, the rise in electric resistance and the reduction in melting point proceed while the second melting part 23B does not melt. Therefore, there is a fear of causing an on-road failure in which the fuse blowout occurs during an ordinary running (while an electric current less than the electric current i1, at which the fuse blowout originally does not occur, flows through the fuse 20). Hereinafter, the dissolution of tin and copper in the second melting part 23B of the fuse 20 is referred to as "fuse degradation".

Figure 4:
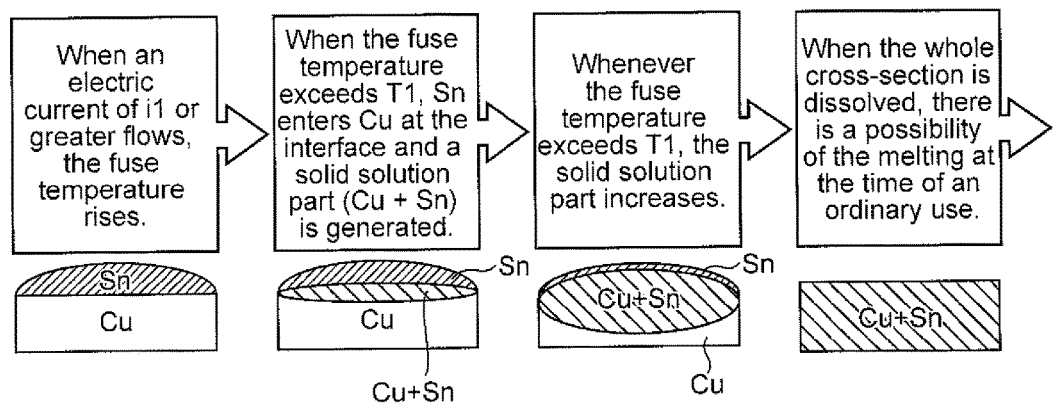
FIG. 4 is a diagram schematically showing a progression of fuse degradation.

FIG. 4 is a diagram schematically showing a progression of the fuse degradation. When the temperature of the second melting part 23B rises to the threshold temperature T1 or higher because an electric current of the electric current i1 or greater flows through the fuse 20, tin enters copper at the interface between tin and copper, and some becomes a solid solution. Such a phenomenon occurs whenever the temperature of the second melting part 23B exceeds the threshold temperature T1, and the ratio of the solid solution part of the cross-section of the second melting part 23B increases gradually. When the solid solution is formed in the whole cross-section of the second melting part 23B, the fuse 20 can melt even at the time of an ordinary use, because of the increase in electric resistance and the reduction in melting point.

In view of the above problem, the ECU 100 according to the embodiment performs a control for inhibiting the proceeding of the fuse degradation (hereinafter, referred to as a "fuse degradation inhibition control"). Specifically, the ECU 100 estimates the fuse temperature, calculates an index (hereinafter, referred to as a "fuse degradation level Y") indicating the level of the proceeding of the fuse degradation accumulated from past to present, based on a history of the estimated fuse temperature, and reduces the allowable input electric power WIN and allowable output electric power WOUT of the battery 10 before the calculated fuse degradation level Y exceeds a limit value, so that a further proceeding of the fuse degradation is inhibited.

Here, the estimation of the fuse temperature is performed by previously obtaining, by experiments or the like, a calculation formula expressing the relation of the fuse temperature to parameters such as the electric current to flow through the fuse 20, and the time during which the electric current flows through the fuse 20, and then substituting the parameters into the calculation formula. As the electric current to flow through the fuse 20, from the monitoring unit 11, the value of the electric current Ib of the battery 10 can be used. As the estimation technique for the fuse temperature, a known technique can be used. Further, in the case where a sensor to directly detect the fuse temperature is provided, the detection value of the sensor may be used without the estimation of the fuse temperature.

Figure 5:
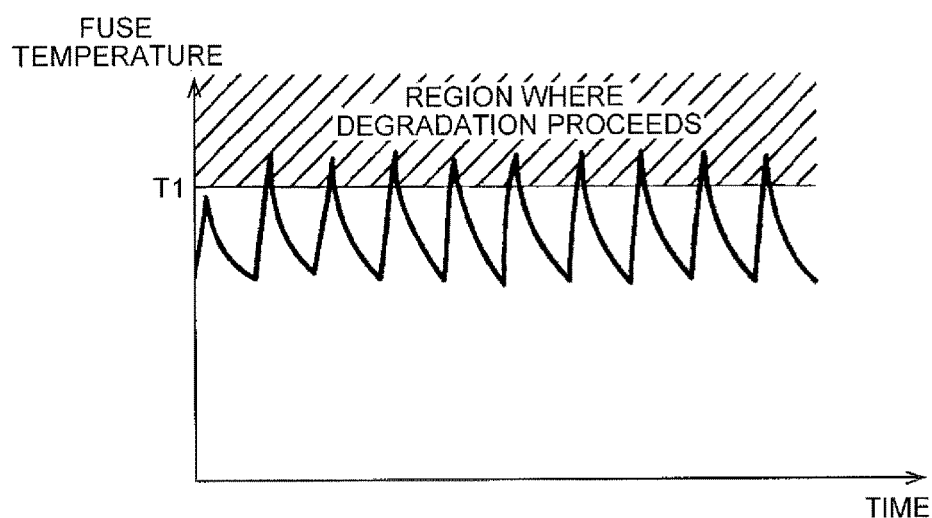
FIG. 5 is a diagram for describing a calculation technique for a fuse degradation level Y.

FIG. 5 is a diagram for describing the calculation technique for the fuse degradation level Y. The fuse degradation (the alloying of tin and copper) irreversibly proceeds in a region (degradation proceeding region) of the temperature equal to or higher than the threshold temperature T1. Therefore, when the fuse temperature exceeds the threshold temperature T1, the ECU 100 calculates a fuse degradation level increase amount, based on the fuse temperature and a time during which the state in which the fuse temperature exceeds the threshold temperature T1 is continued (hereinafter, referred to as a "continuous degradation time"). The calculation of the fuse degradation level increase amount is performed whenever the fuse temperature exceeds the threshold temperature T1. Here, when the fuse temperature is lower than the threshold temperature T1, the fuse degradation does not proceed, and therefore, the fuse degradation level increase amount is not calculated.

Figure 6:
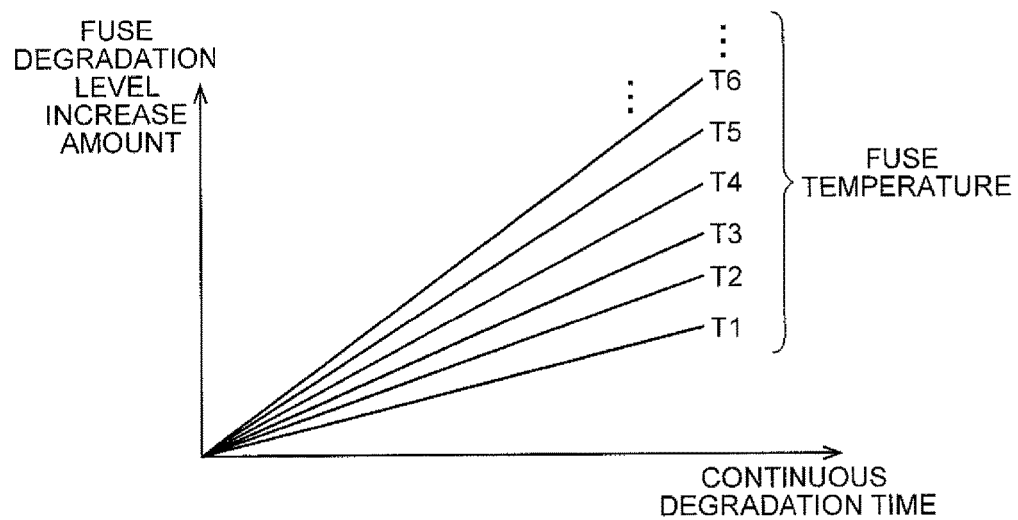
FIG. 6 is a diagram schematically showing a relation of a fuse temperature, a continuous degradation time and a fuse degradation level increase amount.

FIG. 6 is a diagram schematically showing a relation of the fuse temperature, the continuous degradation time and the fuse degradation level increase amount. In FIG. 6, the abscissa indicates the continuous degradation time, the ordinate indicates the fuse degradation level increase amount, and reference characters T1, T2, T3, . . . (T1<T2<T3 . . . ) denote fuse temperatures. As shown in FIG. 6, the ECU 100 estimates the fuse degradation level increase amount to be a greater value, as the continuous degradation time is longer and as the fuse temperature is higher.

Then, in view of the irreversible accumulation of the fuse degradation, the ECU 100 estimates the current fuse degradation level Y to be the value resulting from integrating the fuse degradation level increase amount estimated from past to present.

The ECU 100 previously stores a fuse failure decision line Y1. The fuse failure decision line is set to a value that is lower by a predetermined value than a "fuse blowout line Y2" corresponding to a line when the degradation of the fuse reaches the limit. Here, the fuse blowout line Y2 can be previously obtained by experiments or the like.

Meanwhile, when the estimated fuse degradation level Y reaches the fuse failure decision line Y1, the ECU 100 makes the determination of fuse degradation failure, and reduces each of the WIN/WOUT, to a restriction value P2 (for example, about 15 kw) that is less than an ordinary value P1 (for example, about 21 kw). On this occasion, a message for prompting a user to exchange the fuse 20 may be given by voice or picture.

The restriction value P2 is set to a value that allows the electric current Ib of the battery (that is, the electric current to flow through the fuse 20) to be restricted such that the fuse temperature does not exceed the threshold temperature T1. Therefore, when the input/output electric power of the battery 10 is restricted to the restriction value P2, the degradation of the fuse 20 does not proceed. That is, a further degradation of the fuse 20 is inhibited before the fuse degradation level Y reaches the fuse blowout line Y2. As a result, the occurrence of the fuse blowout during the ordinary running is inhibited.

WIN/WOUT Setting by Fuse Degradation Inhibition Control

As described above, when the fuse degradation level Y reaches the fuse failure decision line Y1, the WIN/WOUT is reduced to the restriction value P2, and thereby, a sudden melting of the fuse 20 during the ordinary running due to the degradation is inhibited.

However, if the WIN/WOUT is maintained at the ordinary value P1 until the fuse degradation level Y reaches the fuse failure decision line Y1, there is a concern that the fuse degradation proceeds earlier than expected, in the case where the battery 10 is used hard, as exemplified by the case where a user frequently repeats a sudden acceleration and a sudden deceleration.

Figure 7:
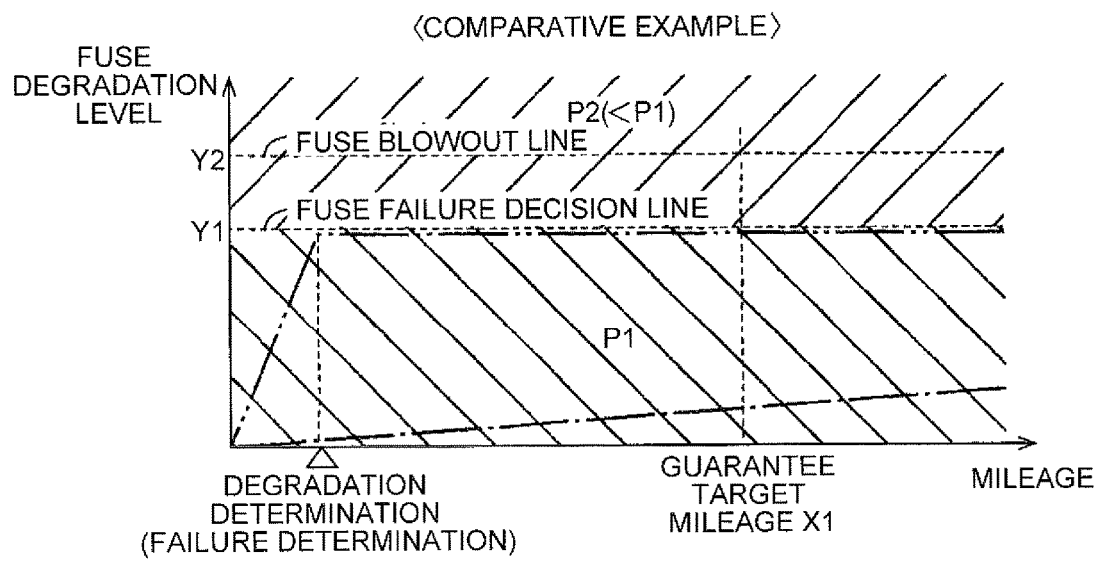
FIG. 7 is a diagram (part 1) showing a comparative example.

FIG. 7 shows an exemplary change in the fuse degradation line Y1 when the WIN/WOUT is maintained at the ordinary value P1 until the fuse degradation level Y reaches the fuse failure decision line Y1, as a comparative example to the embodiment. In FIG. 7, the current proceeding state of the fuse degradation is shown in an orthogonal coordinate system in which the abscissa indicates a cumulative mileage (hereinafter, referred to as merely a "mileage") X of the vehicle 1 and the ordinate indicates the fuse degradation level Y. The same goes for FIG. 8, FIG. 9, FIG. 11, FIG. 12, and FIGS. 15 to 18 described later.

When the battery 10 is used in an ordinary way, the fuse degradation level Y, as shown by a chain line, does not reach the fuse failure decision line, even if the mileage X exceeds a guarantee target mileage X1 (for example, 600000 km) for the vehicle 1. That is, the speed of the proceeding of the fuse degradation is sufficiently low with respect to the vehicle life.

However, when the battery 10 is used in a severer condition than expected, the fuse degradation rapidly proceeds as shown by a two-dot chain line, and the fuse degradation level Y reaches the fuse failure decision line Y1 before the mileage X reaches the guarantee target mileage X1. That is, the life of the fuse 20 becomes shorter than expected.

Hence, the ECU 100 according to the embodiment sets a target degradation level of the fuse, depending on the mileage X, and sets the WIN/WOUT such that the fuse degradation level Y does not exceed the target degradation level set depending on the mileage X. Thereby, it is possible to inhibit the fuse blowout due to the degradation, and to extend the life of the fuse 20.

Figure 8:
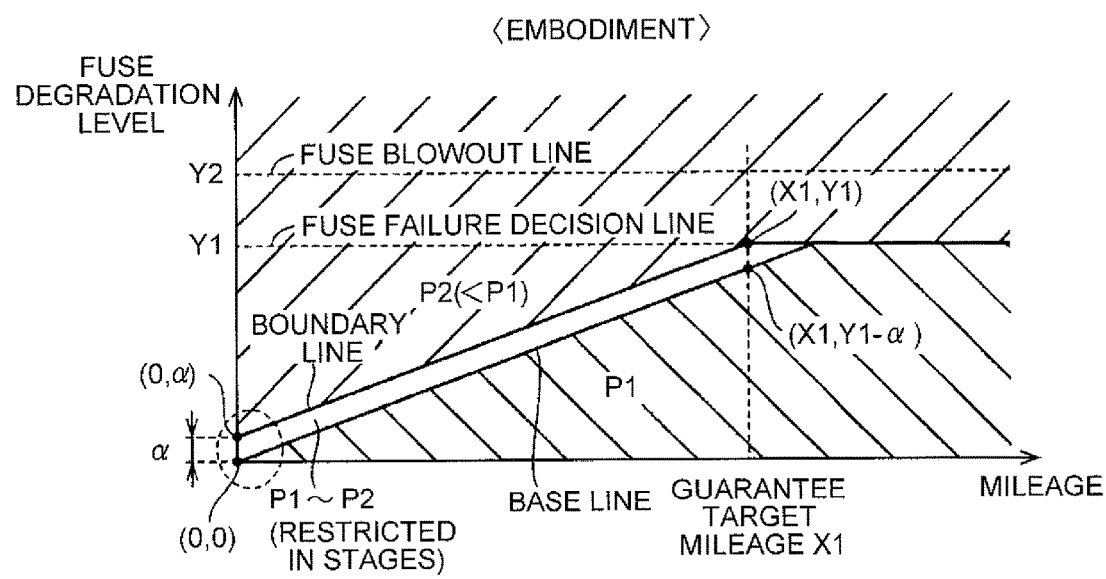
FIG. 8 is a diagram for describing a technique for WIN/WOUT setting.

FIG. 8 is a diagram for describing a technique for the WIN/WOUT setting that is performed by the ECU 100 according to the embodiment. A base line shown in FIG. 8 is a line that linearly connects (0. 0) and (X1, Y1−α). Here, "a" is a value corresponding to the width of a regulation region described later, and a value that is previously decided.

The base line is a line of an upper limit target of the fuse degradation level Y that is permitted with respect to the mileage X. The data of the base line is previously stored in the nonvolatile memory of the ECU 100. The base line corresponds to the above-described target degradation level. When the current fuse degradation proceeding state (X, Y) is included in a lower region relative to the base line, the ECU 100 sets the WIN/WOUT to the ordinary value P1, with no restriction.

On the other hand, when the current fuse degradation proceeding state (X, Y) is included in an upper region relative to the base line, the ECU 100 reduces the WIN/WOUT to less than the ordinary value P1, even if there is still a margin for the fuse failure decision line Y1.

In the embodiment, when the current fuse degradation proceeding state (X, Y) increases across the base line, the WIN/WOUT is not reduced drastically from the ordinary value P1 to the restriction value P2, in consideration of drivability, and is reduced in stages depending on the difference between the current fuse degradation level Y and the base line.

A boundary line shown in FIG. 8 is a line that linearly connects (0, α) and (X1, Y1). When the current fuse degradation proceeding state (X, Y) is included in the regulation region between the base line and the boundary line, the ECU 100 restricts the WIN/WOUT from the ordinary value P1 to the restriction value P2 in stages, depending on the difference between the current fuse degradation level Y and the base line.

When the current fuse degradation proceeding state (X, Y) exceeds the boundary line, a further proceeding of the fuse degradation is not permitted, and therefore, the WIN/WOUT is restricted to the restriction value P2 in a uniform way. Here, when the fuse degradation level Y exceeds the fuse failure decision line Y1, the WIN/WOUT is set to the restriction value P2 in a uniform way, regardless of the mileage X.

Figure 9:
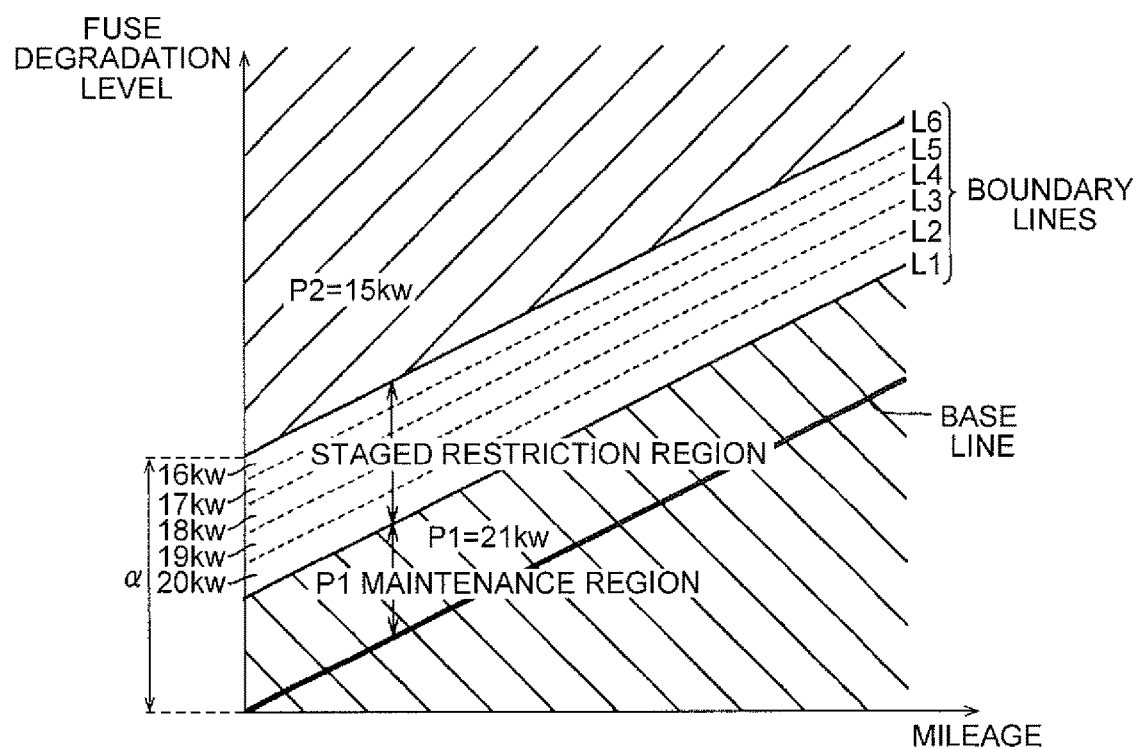
FIG. 9 is an enlarged diagram of a vicinity of the origin (0, 0) in the FIG. 8.

FIG. 9 is an enlarged diagram of a vicinity of the origin (0, 0) in the FIG. 8. Here, FIG. 9 shows an example in which the ordinary value P1 is set to 21 kw, the restriction value P2 is set to 15 kw, and in the restriction region, the WIN/WOUT is restricted from 21 kw to 15 kw in stages. The same goes for FIG. 10 and FIG. 11 described later.

In the embodiment, as shown in FIG. 9, the regulation region is segmented into a P1 maintenance region where the ordinary value P1 is maintained, and a staged restriction region where the WIN/WOUT is restricted from the ordinary value P1 to the restriction value P2 in stages.

When the current fuse degradation proceeding state (X, Y) is included in the P1 maintenance region, the WIN/WOUT is not restricted, and is maintained at the ordinary value P1 with no change, even if the current fuse degradation proceeding state (X, Y) exceeds the base line. This is for avoiding an excessive restriction of the input/output electric power of the battery 10.

On the other hand, when the current fuse degradation proceeding state (X, Y) is included in the staged restriction region, the restriction of the WIN/WOUT is strengthened in stages as the difference between the fuse degradation level Y and the base line increases.

Specifically, as shown in FIG. 9, the staged restriction region is segmented into multiple regions, by multiple boundary lines L1 to L6 that are in parallel to the base line and that are arrayed at a predetermined interval. Here, the data of the boundary lines L1 to L6 is previously stored in the nonvolatile memory of the ECU 100. In a region between the boundary lines L1, L2, the WIN/WOUT is restricted to 20 kw. In a region between the boundary lines L2, L3, the WIN/WOUT is restricted to 19 kw. In a region between the boundary lines L3, L4, the WIN/WOUT is restricted to 18 kw. In a region between the boundary lines L4, L5, the WIN/WOUT is restricted to 17 kw. In a region between the boundary lines L5, L6, the WIN/WOUT is restricted to 16 kw. Then, in a region exceeding the boundary line L6, the WIN/WOUT is restricted to the restriction value P2 (15 kw), which has the greatest restriction amount.

Here, in order to prevent the hunting between the restriction strengthening and restriction relaxing of the WIN/WOUT, the boundary lines L1 to L6 may be divided such that lines for strengthening the restriction and lines for relaxing the restriction are set separately, and a hysteresis may be provided between the two.

Figure 10:
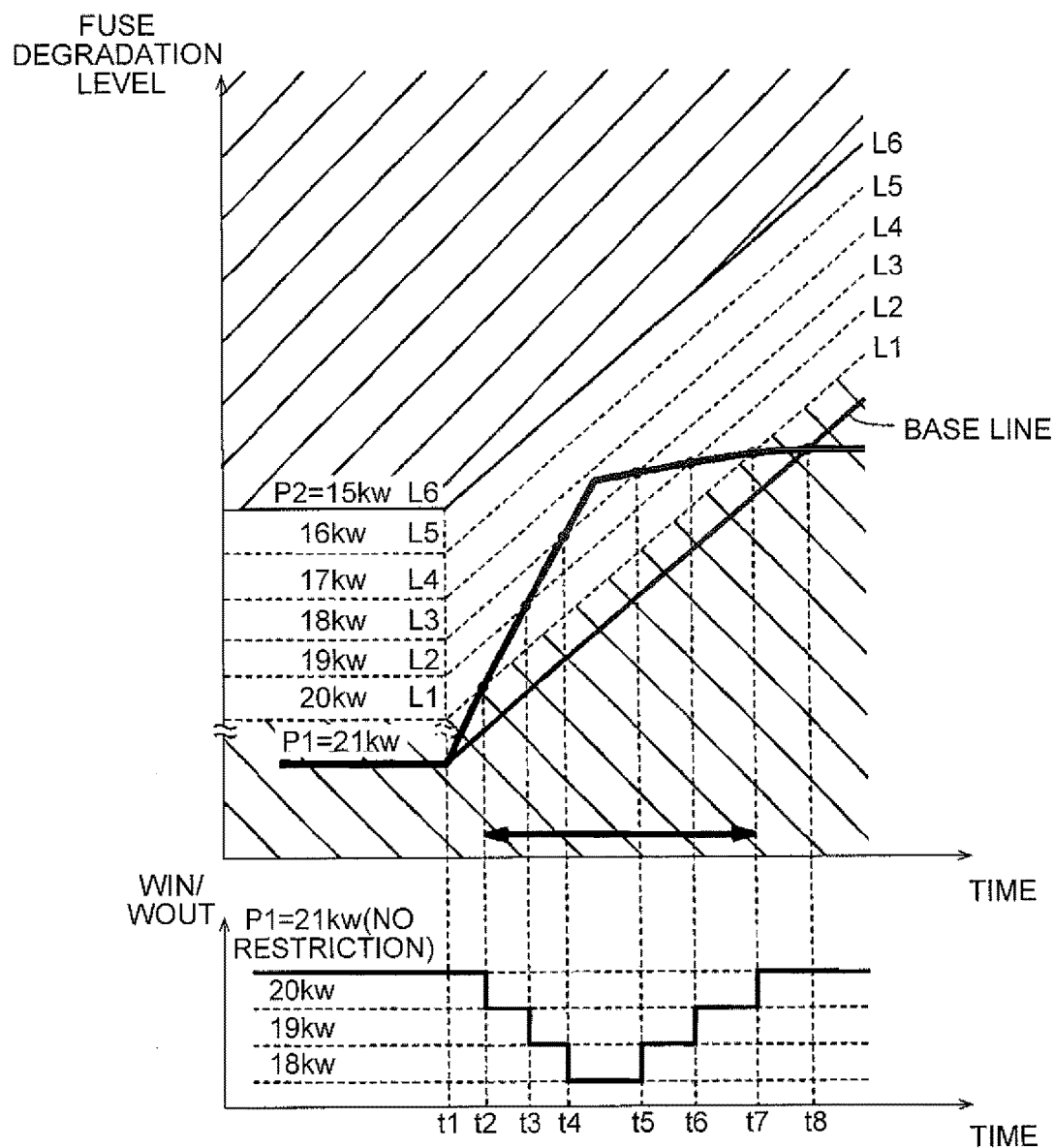
FIG. 10 is a diagram showing an example of the temporal change in the fuse degradation level Y and WIN/WOUT.

FIG. 10 is a diagram showing an example of the temporal change in the fuse degradation level Y and the WIN/WOUT. Before time t1, the fuse degradation level Y is lower than the base line, and the WIN/WOUT is set to the ordinary value P1 (21 kw).

Although the fuse degradation level Y exceeds the base line at time t1, the WIN/WOUT is maintained at the ordinary value P1 (21 kw), until the fuse degradation level Y exceeds the boundary line L1.

When the speed of the proceeding of the fuse degradation level Y is high and the fuse degradation level Y exceeds the boundary lines L1, L2, L3 at times t2, t3, t4 respectively, the restriction of the WIN/WOUT is strengthened to 20 kw, 19 kw and 18 kw in stages.

When the speed of the proceeding of the fuse degradation level Y becomes low by the restriction and the fuse degradation level Y falls below the boundary lines L3, L2, L1 at times t5, t6, t7 respectively, the restriction of the WIN/WOUT is relaxed to 19 kw, 20 kw, 21 kw in stages.

Figure 11:
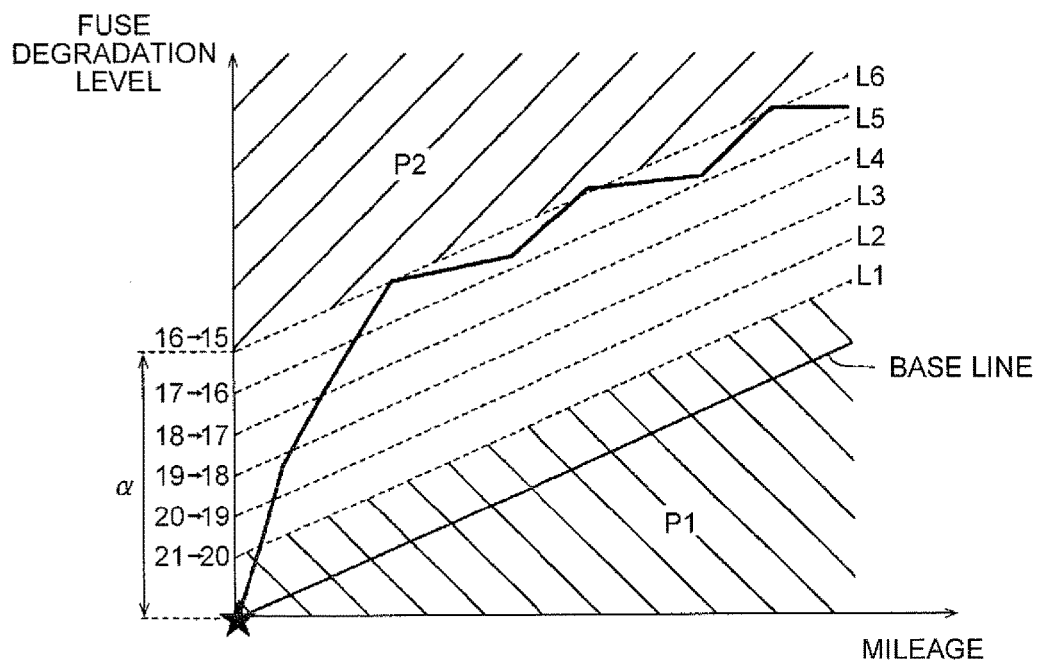
FIG. 11 is a diagram (part 1) showing an example of the change in fuse degradation proceeding state.
Figure 12:
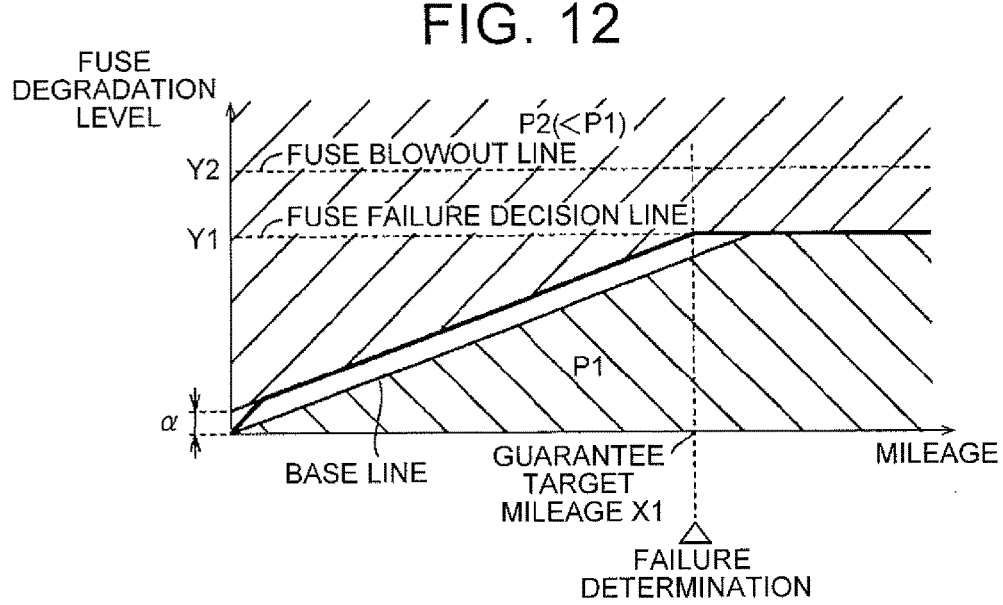
FIG. 12 is a diagram (part 2) showing an example of the change in fuse degradation proceeding state.

FIGS. 11 and 12 are diagrams showing an example of the change in the fuse degradation proceeding state (X, Y) when the battery 10 is used hard.

When the battery 10 is used in a severer condition than expected, the fuse degradation level Y drastically increases at the time of the start of the running of the vehicle 1, as shown in FIG. 11. However, the WIN/WOUT starts to be restricted from the ordinary value P1 in stages at the time point when the fuse degradation level Y exceeds the boundary line L1, and the WIN/WOUT is restricted to the restriction value P2 (15 kw) at the time point when the fuse degradation level Y reaches the boundary line L6.

When the WIN/WOUT is restricted to the restriction value P2 (15 kw), the fuse temperature does not exceed the threshold temperature T1, and the fuse degradation does not proceed anymore. Therefore, the fuse degradation level Y hardly increases. Meanwhile, the value of the boundary line L6 increases, in connection with the increase in the mileage X. Therefore, the fuse degradation level Y does not exceed the boundary line L6, but when a severe condition is continued, the fuse degradation level Y fluctuates as if the fuse degradation level Y is fixed near the boundary line L6.

In consequence, as shown in FIG. 12, until the mileage X reaches the guarantee target mileage X1, the fuse degradation level Y fluctuates as if the fuse degradation level Y is fixed near the boundary line L6. Then, at the time point when the mileage X reaches the guarantee target mileage X1, the fuse degradation level Y reaches the fuse failure decision line Y1, and the determination of the fuse failure is made. That is, even in the case of the continuous use in a severe condition, the fuse degradation level Y is maintained at lower than the fuse failure decision line Y1, at least until the mileage X reaches the guarantee target mileage X1. Therefore, it is possible to inhibit an on-road failure of the fuse 20, and to inhibit the determination of the fuse failure from being made before the mileage X reaches the guarantee target mileage X1 (that is, it is possible to extend the life of the fuse 20).

Figure 13:
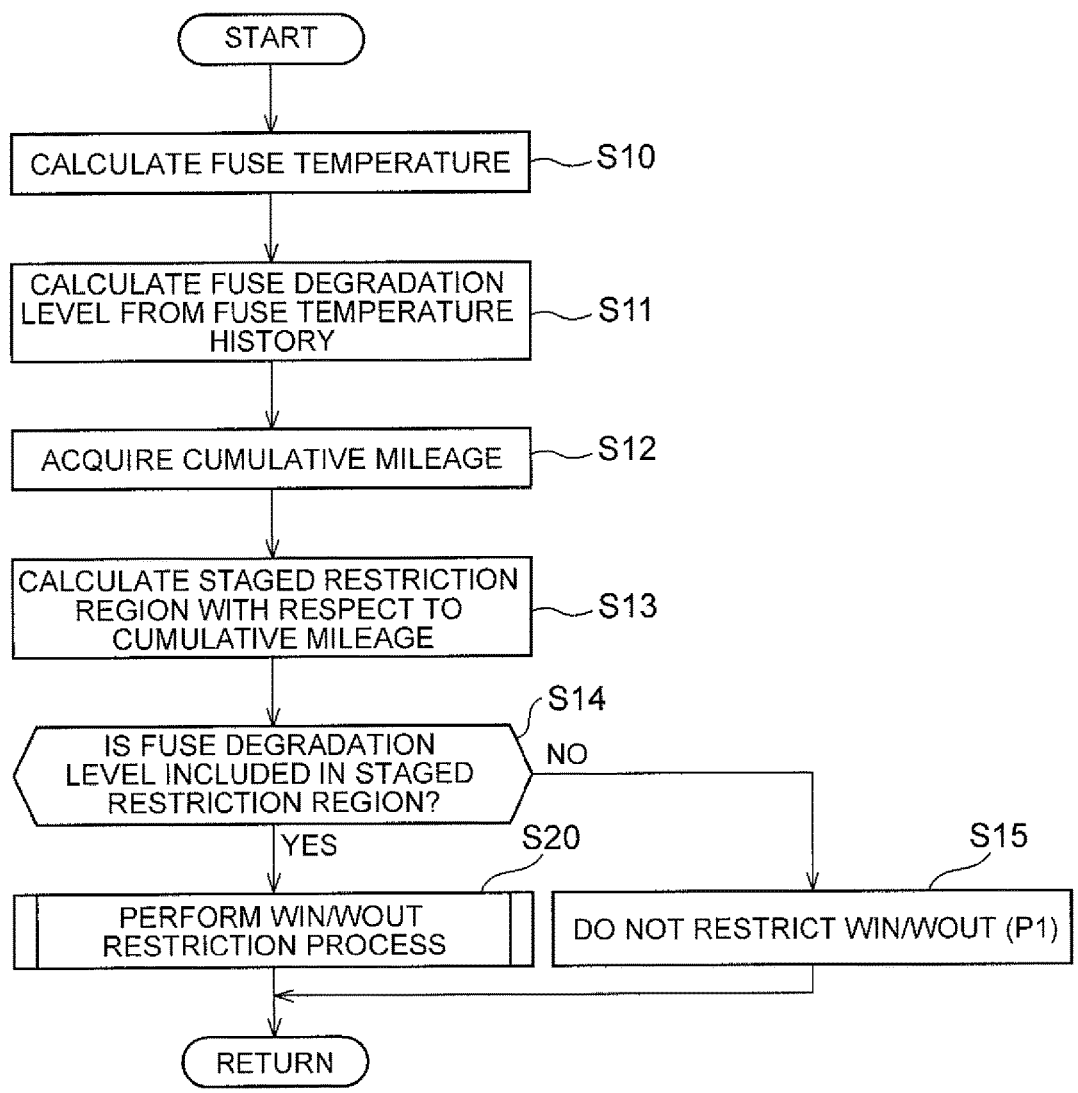
FIG. 13 is a flowchart (part 1) showing a procedure by an ECU.

FIG. 13 is a flowchart showing a procedure when the ECU 100 performs the fuse degradation inhibition control. The flowchart is executed repeatedly in a predetermined cycle.

In step (hereinafter, step is abbreviated to "S") 10, the ECU 100 estimates the fuse temperature. The estimation technique for the fuse temperature has been already described. Here, as described above, in the case where a sensor to directly detect the fuse temperature is provided, the detection value of the sensor may be used.

In S11, the ECU 100 calculates (estimates) the fuse degradation level Y, from the history of the fuse temperature. The specific calculation (estimation) technique for the fuse degradation level Y has been already described with use of the above-described FIG. 5 and FIG. 6.

In S12, the ECU 100 acquires the cumulative mileage X of the vehicle 1, from an odometer (cumulative mileage meter) not illustrated, or the like.

In S13, the ECU 100 calculates the staged restriction region (the region between the boundary lines L1, L6 shown in FIG. 9 and the like) with respect to the cumulative mileage X.

In S14, the ECU 100 determines whether the fuse degradation level Y is included in the staged restriction region. In the case where the fuse degradation level Y is included in the staged restriction region (YES in S14), the ECU 100 performs a WIN/WOUT restriction process in S20 (see FIG. 14 described later).

In the case where the fuse degradation level Y is not included in the staged restriction region (NO in S14), the ECU 100 does not perform the WIN/WOUT restriction process in S15, and sets the WIN/WOUT to the ordinary value P1.

Figure 14:
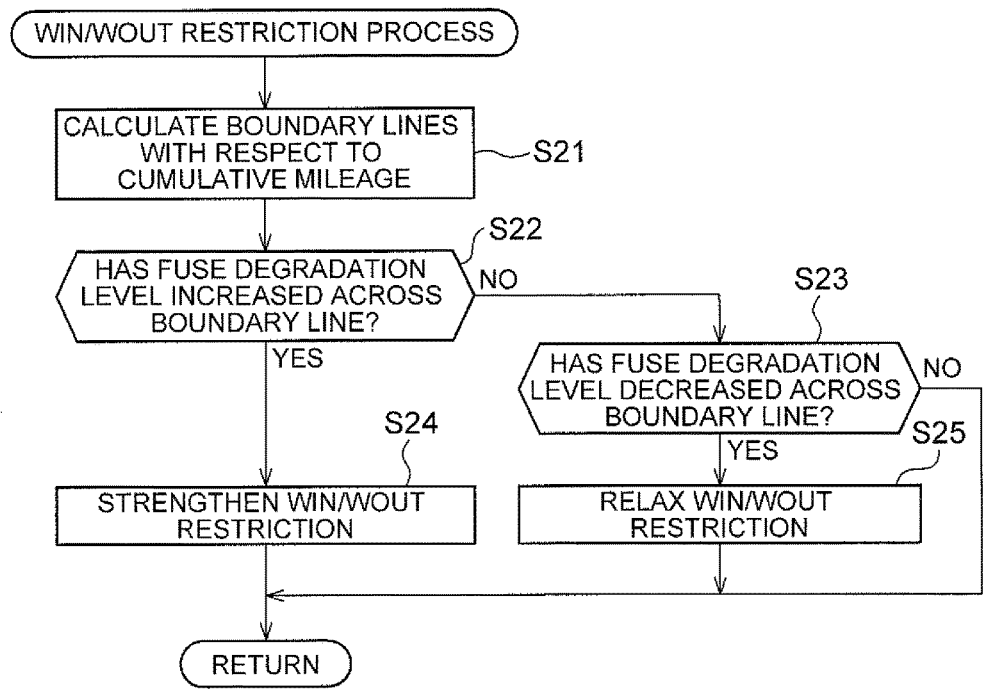
FIG. 14 is a flowchart showing a detailed procedure of a WIN/WOUT restriction process.

FIG. 14 is a flowchart showing a detailed procedure of the process (WIN/WOUT restriction process) of S20 in FIG. 13.

In S21, the ECU 100 calculates each of the values of the boundary lines (the boundary lines L1 to L6 shown in FIG. 9 and the like) with respect to the cumulative mileage X.

In S22, the ECU 100 determines whether the fuse degradation level Y has increased across any of the boundary lines. In S23, the ECU 100 determines whether the fuse degradation level Y has decreased across any of the boundary lines.

In the case where the fuse degradation level Y has increased across any of the boundary lines (YES in S22), the ECU 100 strengthens the restriction of the WIN/WOUT by one stage, in S24. In the case where the fuse degradation level Y has decreased across any of the boundary lines (YES in S23), the ECU 100 relaxes the restriction of the WIN/WOUT by one stage, in S25. The specific processing contents in S22 to S25 have been already described with use of FIG. 10 and the like.

As described above, the fuse degradation inhibition control according to the embodiment is a control in which the base line as the target degradation level of the fuse 20 is set depending on the mileage X and the WIN/WOUT is reduced from the ordinary value P1 to the restriction value P2 in stages when the fuse degradation level Y exceeds the base line set depending on the mileage X.

The base line is a value that is lower than the fuse blowout line Y2 corresponding to a degradation level when the degradation of the fuse 20 reaches the limit. Therefore, it is possible to inhibit the fuse degradation level Y from reaching the fuse blowout line Y2, that is, to the fuse 20 from melting.

Furthermore, the base line is set to a higher value as the mileage X increases, Therefore, when the mileage X is low, the base line is set to a sufficiently low value relative to the fuse blowout line Y2, and it is possible to inhibit the degradation of the fuse 20 more strongly. Thereby, it is possible to inhibit the fuse degradation level Y from reaching the fuse blowout line Y2 early, before the mileage X reaches the guarantee target mileage X1, and to extend the life of the fuse 20.

Here, in the embodiment, in consideration of drivability, the regulation region is provided right above the base line, and in the regulation region, the WIN/WOUT is reduced from the ordinary value P1 to the restriction value P2 in stages. Thereby, it is partially permitted that the fuse degradation level Y exceeds the base line. However, without providing the regulation region, the WIN/WOUT may be reduced to the restriction value P2 immediately, when the fuse degradation level Y exceeds the base line.

Embodiment 2

For performing the fuse degradation inhibition control according to the above-described Embodiment 1, it is necessary to figure out the mileage X and the fuse degradation level Y. Therefore, in the case where, for example, by the exchange of an auxiliary-machine battery to supply electric power to an auxiliary machine system, the interruption (hereinafter, referred to as "auxiliary machine clearing") of the electric power supply from the auxiliary-machine battery to the ECU 100 is performed, and thereafter, the electric power supply from the auxiliary-machine battery to the ECU 100 is restarted, there is a problem of how to figure out the mileage X and the fuse degradation level Y.

For example, if the mileage X and the fuse degradation level Y right before the auxiliary machine clearing are stored in the nonvolatile memory within the ECU 100, the fuse degradation inhibition control can be restarted while the mileage X and the fuse degradation level Y before the auxiliary machine clearing are inherited after the auxiliary machine clearing (that is, while the mileage X and the fuse degradation level Y before the auxiliary machine clearing are adopted as the starting point). However, in the case of employing such a technique, there is a fear of causing an on-road failure of the fuse 20, when the ECU 100, after the auxiliary machine clearing, is mounted in a different vehicle from that before the auxiliary machine clearing.

Figure 15:
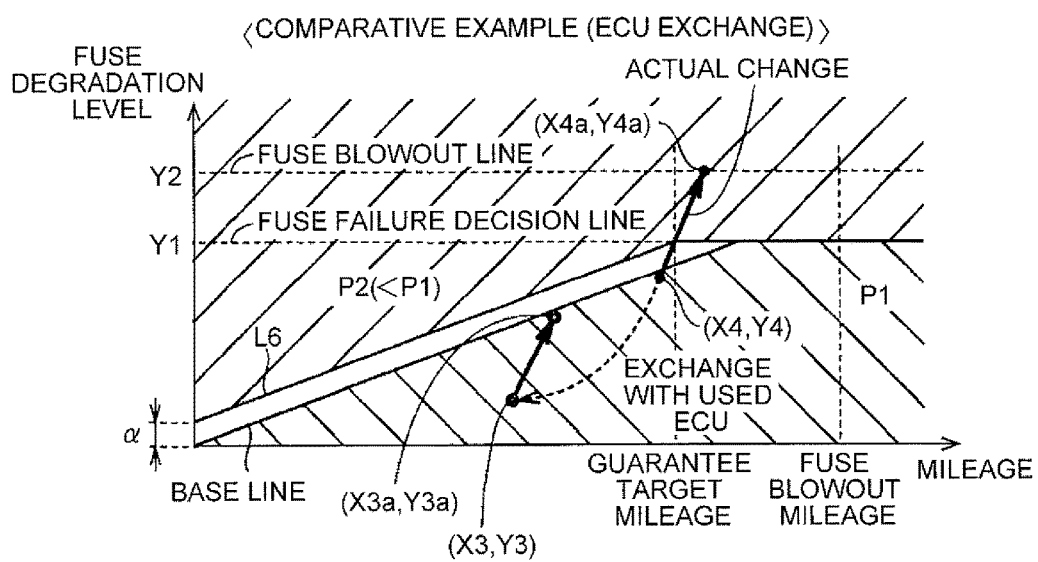
FIG. 15 is a diagram (part 2) showing a comparative example.

FIG. 15 is a diagram showing a case of causing an on-road failure of the fuse 20 after the auxiliary machine clearing, as a comparative example to the embodiment. FIG. 15 shows a case where the ECU 100 storing a fuse degradation proceeding state (X3, Y3) of a vehicle in which the ECU 100 was mounted before the auxiliary machine clearing is mounted in a different vehicle having a fuse degradation proceeding state (X4, Y4), after the auxiliary machine clearing.

In this case, if the ECU 100, after the auxiliary machine clearing, restarts the fuse degradation inhibition control while adopting the fuse degradation proceeding state (X3, Y3) before the auxiliary machine clearing as the starting point, the ECU 100 maintains the WIN/WOUT at the ordinary value P1, until the fuse degradation proceeding state (X3, Y3) becomes (X3a, Y3a) to reach the base line. Therefore, the fuse degradation is permitted.

However, at the time point when the fuse degradation inhibition control is restarted after the auxiliary machine clearing, the actual fuse degradation proceeding state is (X4, Y4). Therefore, by the permission of the fuse degradation, the actual fuse degradation proceeding state becomes (X4a, Y4a) and reaches the fuse blowout line Y2, leading to a fear of the occurrence of an on-road failure of the fuse 20.

In view of such a problem, the ECU 100 according to the embodiment, after the auxiliary machine clearing, does not inherit the information of the mileage X and the fuse degradation level Y before the auxiliary machine clearing, and inhibits the slope of the fuse degradation level Y (the increase amount of the fuse degradation level Y per unit mileage) to less than the slope of the base line, after the auxiliary machine clearing. Hereinafter, such a control is referred to as a "slope inhibition control".

Figure 16:
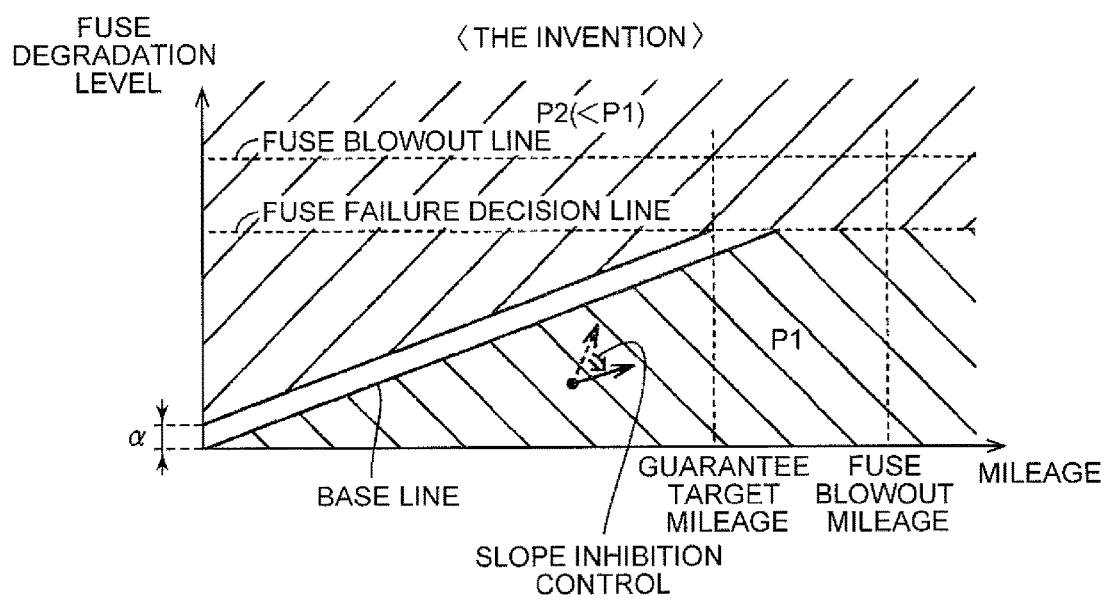
FIG. 16 is a diagram for describing a slope inhibition control.

FIG. 16 is a diagram for describing the above-described slope inhibition control. As shown in FIG. 16, after the auxiliary machine clearing, the ECU 100 restricts the WIN/WOUT such that the slope of the fuse degradation level Y does not exceed the slope of the base line. That is, the ECU 100 sets the WIN/WOUT to the ordinary value P1 when the slope of the fuse degradation level Y is less than the slope of the base line, and reduces the WIN/WOUT to the restriction value P2 when the slope of the fuse degradation level Y exceeds the slope of the base line.

The actual fuse degradation level Y of the vehicle in which the ECU 100 is mounted after the auxiliary machine clearing is supposed to be basically maintained at lower than the base line, by the fuse degradation inhibition control executed before the auxiliary machine clearing, although the specific value is unknown. Therefore, regardless of the state of the actual fuse degradation level Y of the vehicle in which the ECU 100 is mounted after the auxiliary machine clearing, it is possible to inhibit the fuse degradation level Y from exceeding the base line, by the above-described slope inhibition control.

However, in the fuse degradation inhibition control according to the above-described Embodiment 1, it is partially permitted that the fuse degradation level Y exceeds the base line. Therefore, in the case where the fuse degradation level Y exceeds the base line before the auxiliary machine clearing, there is a concern that the fuse degradation level Y reaches the fuse failure decision line Y1 earlier than expected, merely by the execution of the slope inhibition control.

Hence, the ECU 100 stores, in the nonvolatile memory, a difference D resulting from subtracting the value of the base line from the fuse degradation level Y, right before the auxiliary machine clearing. Then, after the auxiliary machine clearing, the ECU 100 reads the difference D stored in the nonvolatile memory, and executes the slope inhibition control from a starting point that depends on the difference D.

Hereinafter, the difference D when the difference D is a positive value (when the fuse degradation level Y right before the auxiliary machine clearing is higher than the base line) is referred to as an "advance difference D(+)", and the difference D when the difference D is a negative value (when the fuse degradation level Y right before the auxiliary machine clearing is lower than the base line) is referred to as an "accumulation difference D(−)".

Figure 17:
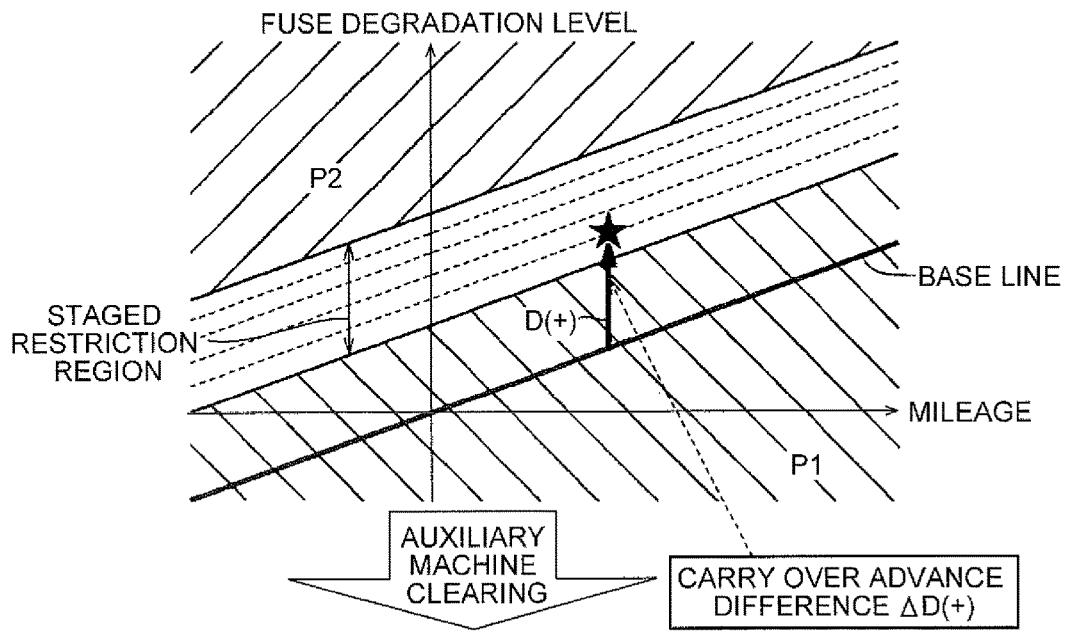
FIG. 17 is a diagram (part 1) showing a starting point of the slope inhibition control.
Figure 17:
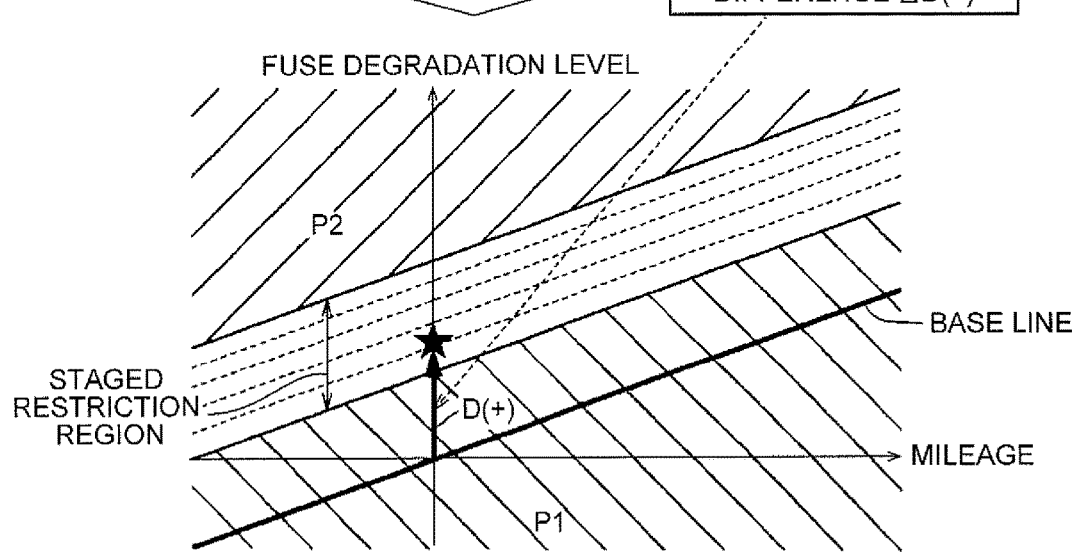

FIG. 17 is a diagram showing a starting point of the slope inhibition control when the advance difference D(+) is stored in the nonvolatile memory. As shown in FIG. 17, when the advance difference D(+) is stored in the nonvolatile memory (that is, when the fuse degradation level Y right before the auxiliary machine clearing is higher than the base line), the advance difference D(+) is carried over after the auxiliary machine clearing, and the slope inhibition control is started while (0, D(+)) is adopted as the starting point. Thereby, until the mileage X reaches the guarantee target mileage X1, the fuse degradation level Y is maintained at lower than the boundary line L6, and is inhibited from reaching the fuse failure decision line.

Figure 18:
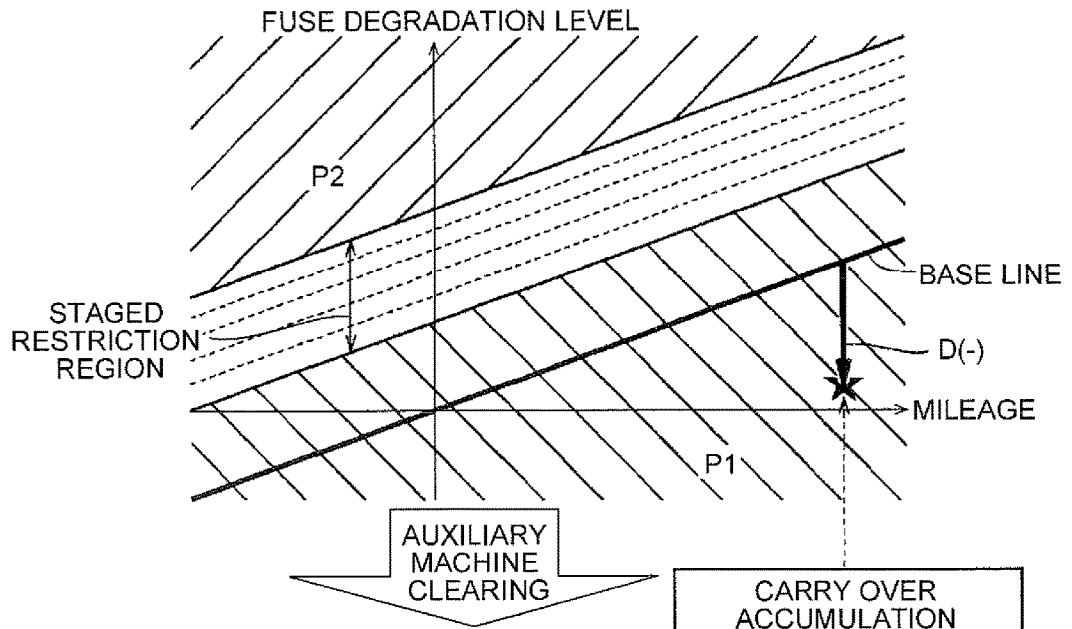
FIG. 18 is a diagram (part 2) showing a starting point of the slope inhibition control.
Figure 18:
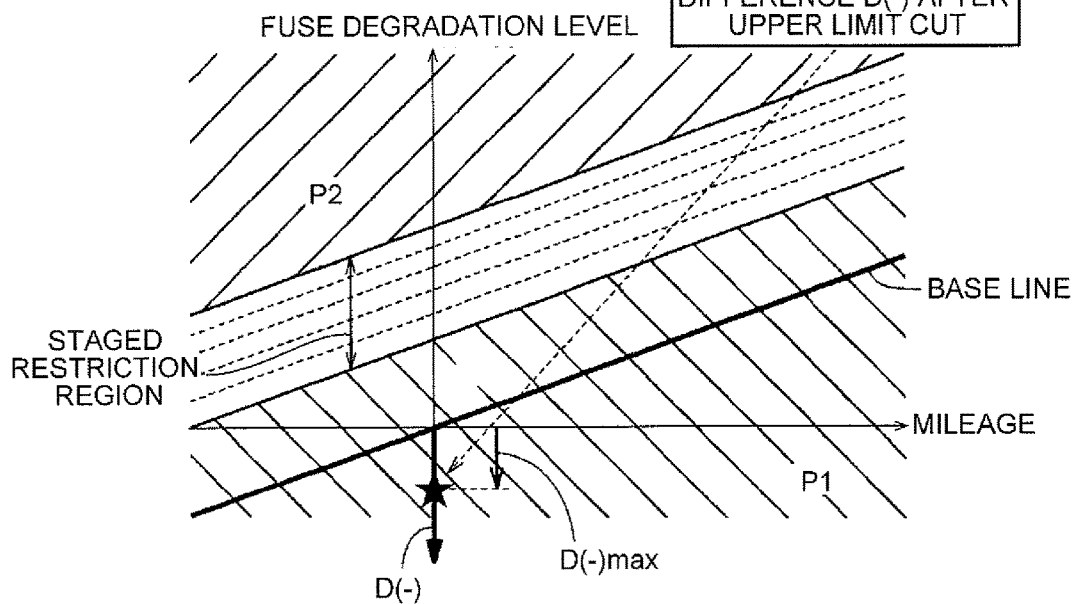

FIG. 18 is a diagram showing a starting point of the slope inhibition control when the accumulation difference D(−) is stored in the nonvolatile memory. When the accumulation difference D(−) is stored in the nonvolatile memory (that is, when the fuse degradation level Y right before the auxiliary machine clearing is lower than the base line), the upper limit cut of the accumulation difference D(−) is previously performed by a previously decided upper limit guard value D(−)max, and the resulting value is carried over after the auxiliary machine clearing. That is, when the magnitude of the accumulation difference D(−) is less than that of the upper limit guard value D(−)max, the slope inhibition control is started while (0, −D(−)) is adopted as the starting point. When the magnitude of the accumulation difference D(−) is greater than that of the upper limit guard value D(−)max, the slope inhibition control is started while (0, −D(−)max) is adopted as the starting point. FIG. 18 shows an example of the start of the slope inhibition control while (0, −D(−)max) is adopted as the starting point. The purpose of the upper limit cut of the accumulation difference D(−) is to reduce the risk of an on-road failure that is caused by an excessive permission of the fuse degradation.

Figure 19:
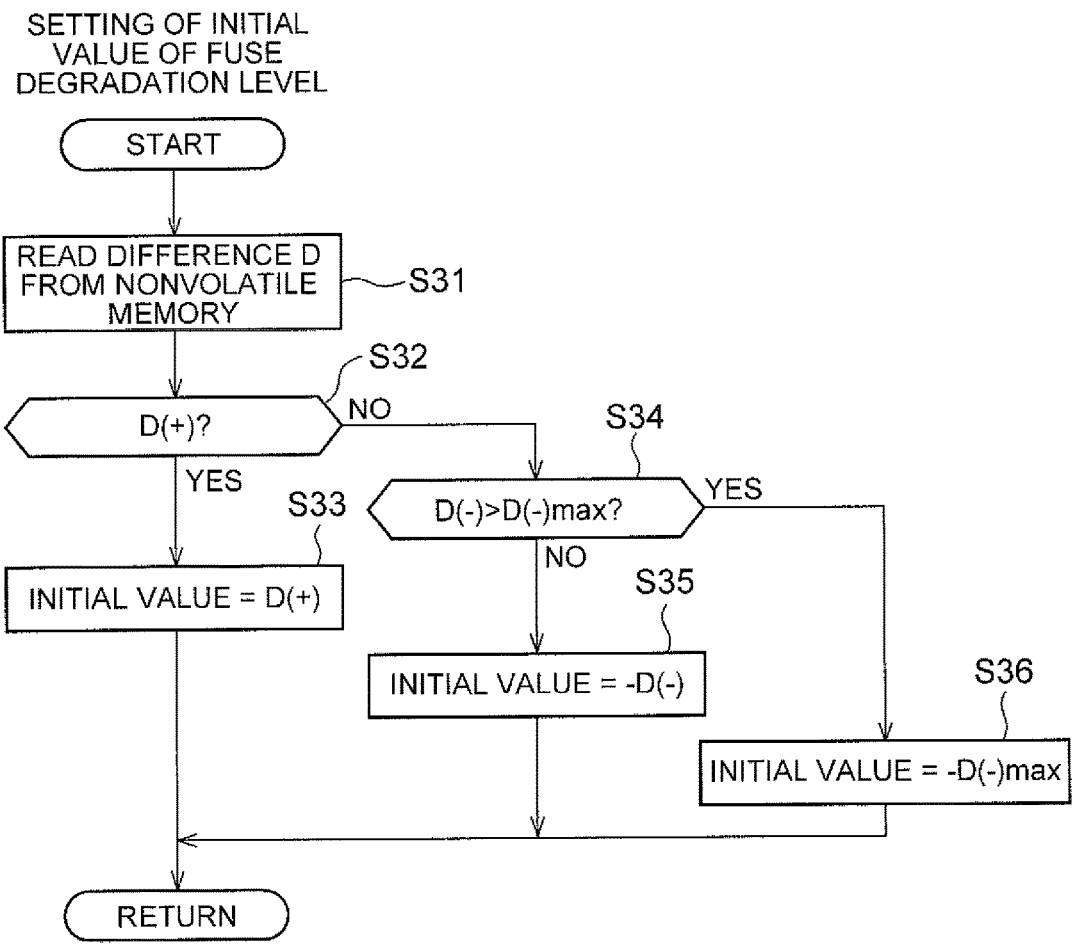
FIG. 19 is a flowchart (part 2) showing a procedure by the ECU.

FIG. 19 is a flowchart showing a procedure that the ECU 100 performs when setting the starting point of the slope inhibition control (the initial value of the fuse degradation level Y). The flowchart is executed when the electric power supply from the auxiliary-machine battery to the ECU 100 is restarted after the auxiliary machine clearing. Here, at the time of the start of the slope inhibition control, the initial value of the mileage X is zero.

In S31, the ECU 100 reads the difference D stored in the nonvolatile memory. In S32, the ECU 100 determines whether the read difference D is the advance difference D(+).

In the case where the read difference D is the advance difference D(+) (YES in S32), the ECU 100, in S32, sets the initial value of the fuse degradation level Y, to "D(+)". Thereby, the above-described slope inhibition control is started while the fuse degradation state (0, D(+)) is adopted as the starting point.

In the case where the read difference D is not the advance difference D(+) (NO in S32), that is, in the case where the read difference D is the accumulation difference D(−), the ECU 100, in S34, determines whether the read accumulation difference D(−) exceeds the upper limit guard value D(−)max.

In the case where the accumulation difference D(−) is less than the upper limit guard value D(−)max (NO in S34), the ECU 100, in S35, sets the initial value of the fuse degradation level Y, to "−D(−)". Thereby, the above-described slope inhibition control is started while the fuse degradation state (0, −D(−)) is adopted as the starting point.

In the case where the accumulation difference D(−) exceeds the upper limit guard value D(−)max (YES in S34), the ECU 100, in S36, sets the initial value of the fuse degradation level Y, to "−D(−)max". Thereby, the above-described slope inhibition control is started while the fuse degradation state (0, −D(−)max) is adopted as the starting point.

Thus, right before the auxiliary machine clearing, the ECU 100 according to the embodiment stores the difference D resulting from subtracting the value of the base line from the fuse degradation level Y, in the nonvolatile memory. Then, after the auxiliary machine clearing, the ECU 100 reads the difference D stored in the nonvolatile memory, and executes the slope inhibition control from a starting point that depends on the difference D. Therefore, even when the ECU 100, after the auxiliary machine clearing, is mounted in a different vehicle from a vehicle in which the ECU 100 is mounted before the auxiliary machine clearing, it is possible to inhibit adequately an on-road failure of the fuse.

It should be understood that the embodiments disclosed herein are examples and are not limiting in all respects. It is intended that the scope of the invention is shown by not the above description but the claims, and includes all modifications in a meaning and scope equivalent to the claims.

What is claimed is:

1. A vehicle capable of running by using dynamic power of a motor, the vehicle comprising:
    a battery configured to perform input and output of electric power for the motor;
    a fuse configured to be connected in series with the battery and to melt when an electric current exceeding a permissible value flows; and
    a control apparatus configured to restrict magnitude of the input and output electric power of the battery to less than an upper limit electric power, wherein
    the control apparatus is configured to calculate a degradation level of the fuse such that degradation proceeds whenever temperature of the fuse exceeds a threshold temperature, and is configured to reduce the upper limit electric power when the degradation level of the fuse exceeds a target degradation level, and
    the target degradation level is a value that is lower than a limit degradation level and that becomes higher as mileage of the vehicle increases, the limit degradation level corresponding to a degradation level when the degradation of the fuse reaches a limit.

2. The vehicle according to claim 1 wherein
    the temperature of the fuse is lower than the threshold temperature, when the magnitude of the input and output electric power of the battery is a predetermined electric power or less, and
    the control apparatus is configured to set the upper limit electric power to a first electric power greater than the predetermined electric power, when the degradation level of the fuse is lower than the target degradation level, and is configured to reduce the upper limit electric power to a second electric power equal to or less than the predetermined electric power, when the degradation level of the fuse exceeds the target degradation level.

3. The vehicle according to claim 2 wherein
    the control apparatus is configured to reduce the upper limit electric power from the first electric power to the second electric power in stages, depending on a difference by which the degradation level of the fuse exceeds the target degradation level.

4. The vehicle according to claim 1 wherein
    the control apparatus is configured to execute a slope inhibition control when electric power supply from an auxiliary-machine battery to the control apparatus is restarted after the electric power supply is interrupted, the slope inhibition control being a control to reduce the upper limit electric power when an increase amount of the degradation level of the fuse per unit mileage exceeds an increase amount of the target degradation level per unit mileage.

5. The vehicle according to claim 4 wherein
    the control apparatus is configured to store a difference right before the electric power supply is interrupted, and to hold the difference even after the electric power supply is interrupted, the difference being a difference resulting from subtracting the target degradation level from the degradation level of the fuse, and
    the control apparatus is configured to start the slope inhibition control from a state in which the mileage is reset to zero and the degradation level of the fuse is reset to a value depending on the difference, when the electric power supply is restarted.

* * * * *